United States Patent
Smith et al.

[19]

[11] Patent Number: 5,961,183
[45] Date of Patent: Oct. 5, 1999

[54] TUMBLE FORWARD SEAT WITH AUTOMATIC SEAT ADJUSTER RETURN

[75] Inventors: Francis Nile Smith, Clarkston; Carmen Leigh Markstrom, Novi, both of Mich.

[73] Assignee: General Motors Corporation, Detroit, Mich.

[21] Appl. No.: 09/047,791

[22] Filed: Mar. 25, 1998

[51] Int. Cl.[6] .................................................. A47C 1/02
[52] U.S. Cl. ................ 297/322; 296/65.15; 297/331; 297/335; 297/344.1; 297/317; 248/429
[58] Field of Search .................................... 297/331, 335, 297/336, 344.1, 317, 322; 296/65.03, 65.13, 65.14, 65.15; 248/503.1, 429, 430

[56] References Cited

U.S. PATENT DOCUMENTS

| | | | |
|---|---|---|---|
| 3,880,464 | 4/1975 | Murphy et al. | 297/326 X |
| 4,368,916 | 1/1983 | Blasin | 297/341 |
| 5,238,285 | 8/1993 | Holdampf et al. | 296/65.1 X |
| 5,282,662 | 2/1994 | Bolsworth et al. | 296/65.1 |
| 5,368,355 | 11/1994 | Hayden et al. | 296/65.1 |
| 5,443,239 | 8/1995 | Laporte | 248/503.1 |
| 5,482,345 | 1/1996 | Bolsworth et al. | 276/65.1 |
| 5,570,931 | 11/1996 | Kargilis et al. | 297/378.12 |
| 5,671,965 | 9/1997 | O'Conner | 296/65.1 X |
| 5,711,505 | 1/1998 | Nemoto | 248/424 X |
| 5,722,727 | 3/1998 | Unckrich | 297/336 |
| 5,730,496 | 3/1998 | Hashimoto | 297/335 |
| 5,765,894 | 6/1998 | Okazaki et al. | 296/65.1 X |
| 5,820,216 | 10/1998 | Feuillet | 297/341 |
| 5,873,629 | 2/1999 | Shuler | 297/341 X |
| 5,882,074 | 3/1999 | Kojima | 297/341 X |

OTHER PUBLICATIONS

L'Automobile Magazine/Dec. 1996; Fiche technique page suivante (2 views).

*Primary Examiner*—Milton Nelson, Jr.
*Assistant Examiner*—Brian H. Buck
*Attorney, Agent, or Firm*—Charles E. Leahy; Patrick M. Griffin

[57] ABSTRACT

A tumble forward seat for a van or the like includes a device to automatically unlatch the seat adjuster, return the seat from any forwardly adjusted position to its rearwardmost position, and relatch the seat adjuster, during the forward rotation. A specially designed cam and lift lever push the pivoting release handle of the seat adjuster up and open and hold it open while a wedging surface and pusher block react against one another to shift the seat cushion frame back. The lift lever resets itself as the seat is rotated back. The cam, lift lever, and wedging surface are coordinated to one another so as to always provide the correct degree of opening and shifting motion, regardless of initial seat adjusted position.

3 Claims, 9 Drawing Sheets

TUMBLE FORWARD SEAT WITH AUTOMATIC SEAT ADJUSTER RETURN

TECHNICAL FIELD

This invention relates to so called tumble forward vehicle seats in general, and specifically to such a seat which includes a mechanism to automatically return and reset the seat adjuster mechanism as it is tumbled forward to its stowed position.

BACKGROUND OF THE INVENTION

With the continuing and growing popularity of minivans and SUVs, removable and flexible rear seating has received increasing attention. It is desirable that rear seats be removable or, in the alternative, capable of being folded and rotated or "tumbled" forward to a stowed position. This allows for extra cargo space when the extra rear seating is not needed, but does not require that the seat be taken out completely. The rear two of the seats four legs can be unhooked from the vehicle floor, and then the whole seat is rotated or "tumbled" forward about pivots on the front two legs. Generally, the seat back is folded down onto the seat cushion into a "table" position before it is stowed. This is a relatively simple process, so long as the seat cushion frame is solid, and not capable of being adjusted fore and aft. Lack of fore/aft positioning has been common for rear seats, but is being added as a feature on newer vehicles, to give rear seat passengers the same convenience of adjusting for leg room. However, attempting to tumble forward a rear seat which happens to also be adjusted to a forward position can present a problem.

As illustrated in simplified form in FIG. 1, a vehicle seat base "B" sits fixed to a vehicle floor "F" in a seating position. A seat cushion frame "C" separate from the base B can be adjusted back and forth on a conventional slide and adjuster, but is shown in its most rearward position. The front legs of the seat base are hooked to F by a pivot assembly, indicated simply by a tumble axis "$T_A$". The normal angular position of the back edge of the seat base B relative to axis $T_A$ is indicated by the dotted line "O". The rear of the seat base B can be released to allow the seat base B and cushion frame C to pivot, as one unit, forwardly by an angle $\alpha$. The tumble angle can vary between vehicles, and need not be 90 degrees or more in order for the seat to remain up in a stable tumbled position. As shown in FIG. 2, the seat moves to its stowed position with no problem when it is adjusted in its rearwardmost position to start with.

However, as shown in FIG. 3, the seat cushion frame C might have been initially adjusted forwardly by a shorter legged occupant, and left locked in that forward position. In that event, as shown in FIG. 4, it is possible for the forwardly shifted seat cushion frame C to hit the floor F, or possibly the back of the seat in front of it, before it rotates through the entire tumble angle, preventing it from fully reaching the stowed position. Without any compensating return mechanism, the operator would have to return the seat, relock it to the floor, sit in it, adjust it back rearwardly, and begin again.

Providing any mechanism to automatically return the seat cushion frame to its rearward position concurrent with tumbling the seat forward is greatly complicated by the way in which a typical adjuster release works. As illustrated in FIGS. 5 and 6, the most common seat adjuster release is a handle H, pivoted to the seat cushion frame C, which, when lifted against the force of a biasing spring, unlatches the seat cushion frame C from the base B, allowing it to be shifted fore or aft to any desired position, and which pivots back down when released to automatically relatch in the new position. Relative to any fixed point on the seat base B or floor F, the distance by which the handle H must be raised in order to release the adjuster latch varies, depending on where the seat cushion frame C is located. The tumble axis $T_A$ makes a convenient reference frame, since it neither rotates nor shifts back and forth relative to the floor, but other parts of the seat rotate and shift back and forth relative to it. The generally horizontal handle H shifts back and forth past and over the tumble axis as the seat cushion frame C shifts. The handle H, being straight and horizontal, has a least or fixed radial distance Ro from the tumble axis at all adjusted seat positions, but the additional radial distance that the handle H must be pulled up varies depending on the adjusted position of seat cushion frame C. As shown in FIG. 5, when the seat cushion frame C is rearwardmost, the additional radial distance $R_g$ is greatest, because the lever arm is longest. As shown in FIG. 6, the opposite holds when seat cushion frame C is forwardmost, and the release distance $R_L$ is the least, because the lever arm is the smallest. This variation presents no problem to the manual seat operator occupying the seat, since he or she simply pulls the handle H up far enough to unlatch the adjuster, and holds it up while moving the seat back and forth. But a mechanical adjustment means would not move back and forth with the seat cushion the way a human occupant does. Likewise, such an automatic mechanism would have to emulate all the other actions of a seat occupant, including pushing the seat cushion frame C all the way back, and releasing the handle H to relatch. This presents a formidable and complex design challenge.

The only known design that provides a means for shifting the seat cushion frame backward during the forward rotation of the seat base is found in the Renault "Espace" minivan. There, the interference of the seat cushion with the floor of the vehicle referred to above is actually used to unlock the seat adjuster and push the seat cushion frame back. The adjuster release handle is designed to contact the vehicle floor, which contact pushes it up to unlatch the adjuster before the front of the seat cushion hits the floor to be pushed back. This is not a desirable solution for several reasons. Most latch release handle designs would have to be significantly modified in order to extend forwardly far enough to hit the vehicle floor as the seat was rotated forward. This could cause the latch handle to hit the heels of a seat occupant. In addition, not all seat designs will be of a type in which the front of the forwardly adjusted seat cushion hits the vehicle floor. They might contact the back of the seat located in front of them instead, which would not work, since that contact would occur before the latch release handle had contacted the floor. In addition, the latch release handle would remain in the released condition while the seat was stowed, and would not relatch until the seat began to be rotated back to its normal seating position. That would give the seat cushion frame time to slip forwardly again. A far better design would be one that actually prevented contact of the seat cushion or the latch release handle with any other part of the vehicle, and which operated based solely on the normal forward rotation of the seat base.

SUMMARY OF THE INVENTION

The invention provides an automatic mechanism which works in cooperation with the tumbling forward of the seat to shift the seat cushion frame back to its rearwardmost position, if the seat cushion frame is not already in that position. The operator need do nothing more than release the rear legs of the seat base from the floor to tumble forward as usual.

In the preferred embodiment disclosed, a cam and lift mechanism on one side of the seat unlatches the seat adjuster just before a rotary to linear force transition means on the other side of the seat begins to push the seat cushion frame back. These two mechanisms work automatically and in conjunction with each other, activated just by the tumble forward motion of the seat. They also cooperate to provide just the correct and proportional amount of simultaneous adjuster release handle lift and seat cushion frame rearward shifting, dependent on how far forwardly the seat cushion frame was adjusted before it was tumbled forward.

The cam is fixed to the floor, and has a curved cam surface arrayed about the tumble axis, with an arc extending between rear and front edges that matches the angle over which the seat tumbles. The adjuster release handle, which is pivoted to the seat cushion frame, has a straight contact section that extends horizontally forward, over and past the tumble axis. A lift lever, which is pivoted to the seat base, has a cam follower roller that starts out at the rear edge of the cam surface, and a handle lift roller that sits just beneath the straight section of the adjuster release handle. The cam surface rises continually by a total increment substantially equal to the greatest release distance of the release handle. At a relatively small angular or arc distance from the rear edge, about ten degrees as disclosed, the cam surface rises abruptly by just the least release distance. Therefore, even if the seat cushion frame is adjusted all the way forward before the tumble rotation begins, the lift roller will have risen enough within the first ten degrees to push the release handle up enough to release the seat cushion frame. If the seat cushion frame is not as far forward at the start, then the cam follower roller will reach the proper release distance at some unlatch point farther along the cam surface, farther into the rotation. After the release point is reached, the handle will continue to lift farther as the cam follower rolls farther along, so as to keep the handle lifted and released.

In the embodiment disclosed, the cam follower roller is also journaled on a spring loaded plunger, and a wedge at the front edge of the cam surface contacts the cam follower roller at the end of travel. The wedge compresses the plunger and pushes the cam roller outboard, off of the cam surface and down along side of the cam. This allows the lift lever to pivot down, and allows the adjuster release handle to pivot back down under its own bias to relatch the adjuster. Then, when the seat base is rotated back and relocked to the vehicle floor, the spring loaded cam roller slides along the side of the cam, below, but not along, the cam surface until the cam roller again reaches the rear edge of the cam surface and pops back to reset to its starting position.

The rotary to linear force transition mechanism that pushes the seat cushion frame back, as disclosed, is a backwardly sloped wedging surface, which is fixed to the seat cushion frame, and a wedging block, which is fixed to the vehicle floor. As the seat tumbles forward, the backwardly sloped wedging surface hits, and slides along the wedging block, covering all of its surface length, or some of it, or none of it, depending on how far away from the wedging block the wedging surface was to begin with. The backward slope of the wedging surface creates a rearward push off of the wedging block as it rotates around the wedging block, shifting the seat cushion frame backward.

In operation, and assuming that the seat is forwardly adjusted to the greatest degree, and therefore needs the greatest degree of rearward shifting for successful storage, the seat base is released from the floor. As the seat begins to tumble forward, within the first ten degrees of rotation, the lift roller abruptly lifts the adjuster release handle by the relatively small distance needed to release it. Simultaneously, on the other side of the seat, the wedging surface contacts the fixed wedging block near its front edge and begins to rotate around it and slide along it. The seat cushion frame begins to be pushed back relative to the seat base, off of the fixed wedging block, and the release handle shifts back with the frame. However, concurrently, the cam follower roller is also rolling farther along the cam surface, continually lifting the adjuster handle sufficiently higher to keep the adjuster unlatched over the whole range of motion. Just as the wedging block reaches the end of the wedging surface, the seat cushion frame has been pushed all the way back.

When seat base rotation begins with the seat cushion frame adjusted forwardly, the cam follower roller and lift roller reach the necessary release distance only after having moved farther along the rising cam surface. The correct, proportionate degree of both handle release lift distance and seat cushion frame backward shifting is always achieved, automatically. As the seat base is returned to its normal seating position, the cam follower roller resets to its initial position.

BRIEF DESCRIPTION OF THE DRAWINGS

These and other features of the invention will appear from the following written description, and from the drawings, in which.

DESCRIPTION OF THE PREFERRED EMBODIMENT

Figure 5:
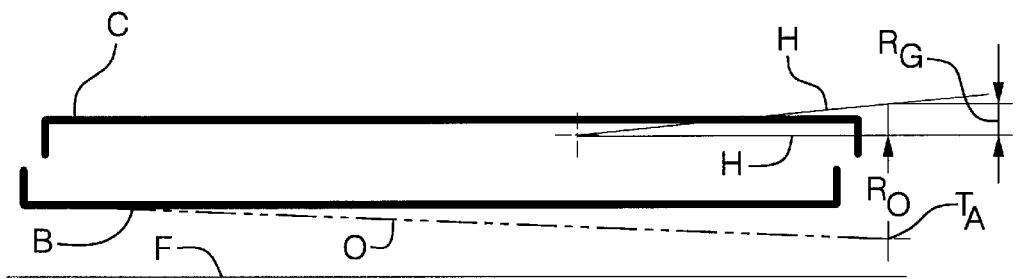
FIG. 5 is a schematic view showing the release distance required for an adjuster release handle, as measured relative to the tumble axis, when the seat cushion frame is all the way back.
Figure 6:
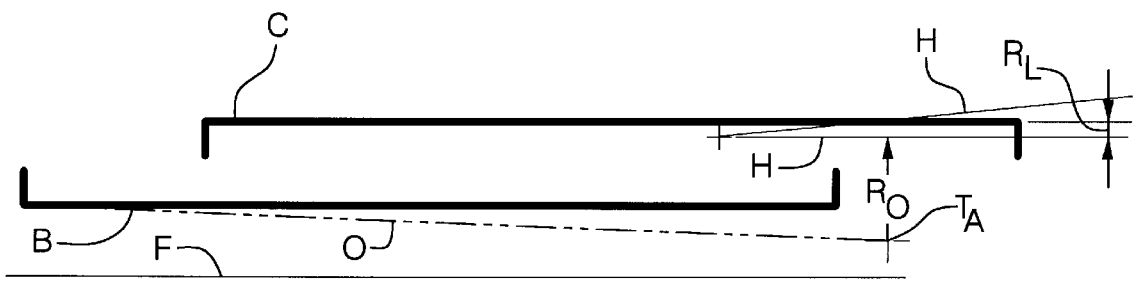
FIG. 6 is a view similar to FIG. 5, but showing the greater release distance required when the seat cushion frame is all the way forward.

Referring again to FIGS. 5 and 6, it is useful the review the concept of a release distance as measured relative to the reference frame of the tumble axis Ta. The typical adjuster latch release handle H extends forward and past the front of the seat base B, above the tumble axis Ta. Any straight, horizontal section of the handle H will, as the seat cushion frame moves back and forth, maintain a base distance Ro above the tumble axis Ta. If the seat is at limit position, fully back as shown in FIG. 5, the handle H, when pulled up about its pivot axis over the relatively small angle necessary to open the seat adjuster latch, will also rise a certain additional distance above Ta. Technically, that additional distance, shown as Rg, is the chord distance of an arc located just above Ta. While that angle is a constant, the chord length of the arc as measured above Ta changes, depending on how far forward the seat cushion frame C is pushed forward. For the FIG. 5 position, the arc distance Rg is greatest. In the other limit position shown in FIG. 6, with the seat cushion C adjusted all the way forward, the arc is smallest, since it is much closer to the pivot point, or apex of the angle.

Figure 7:
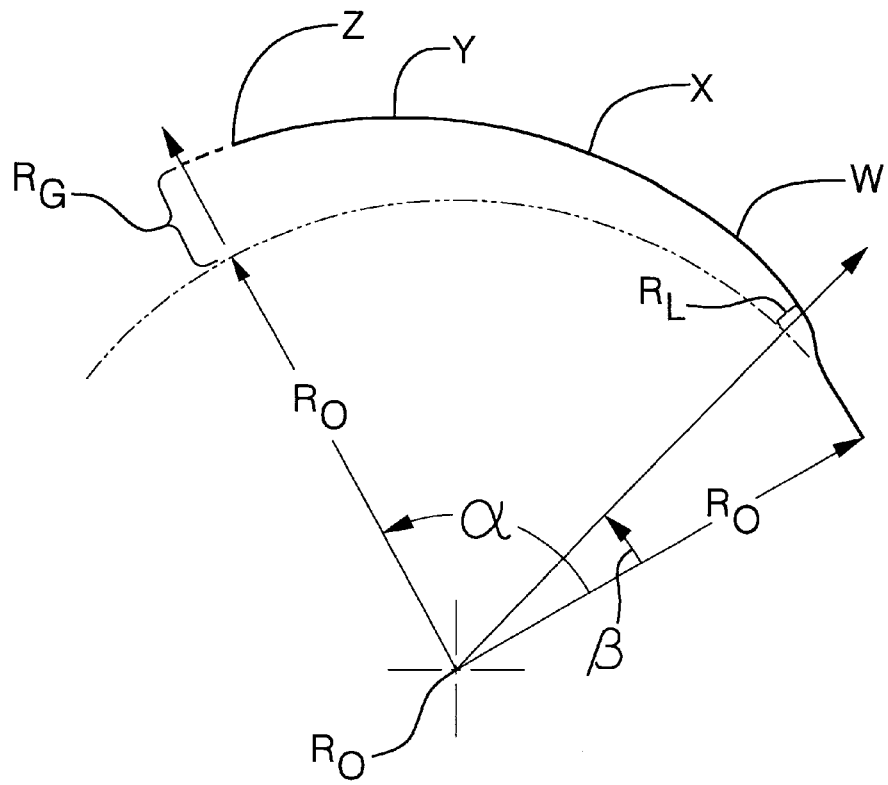
FIG. 7 is a schematic view showing the shape of the cam relative to the tumble axis.
Figure 14:
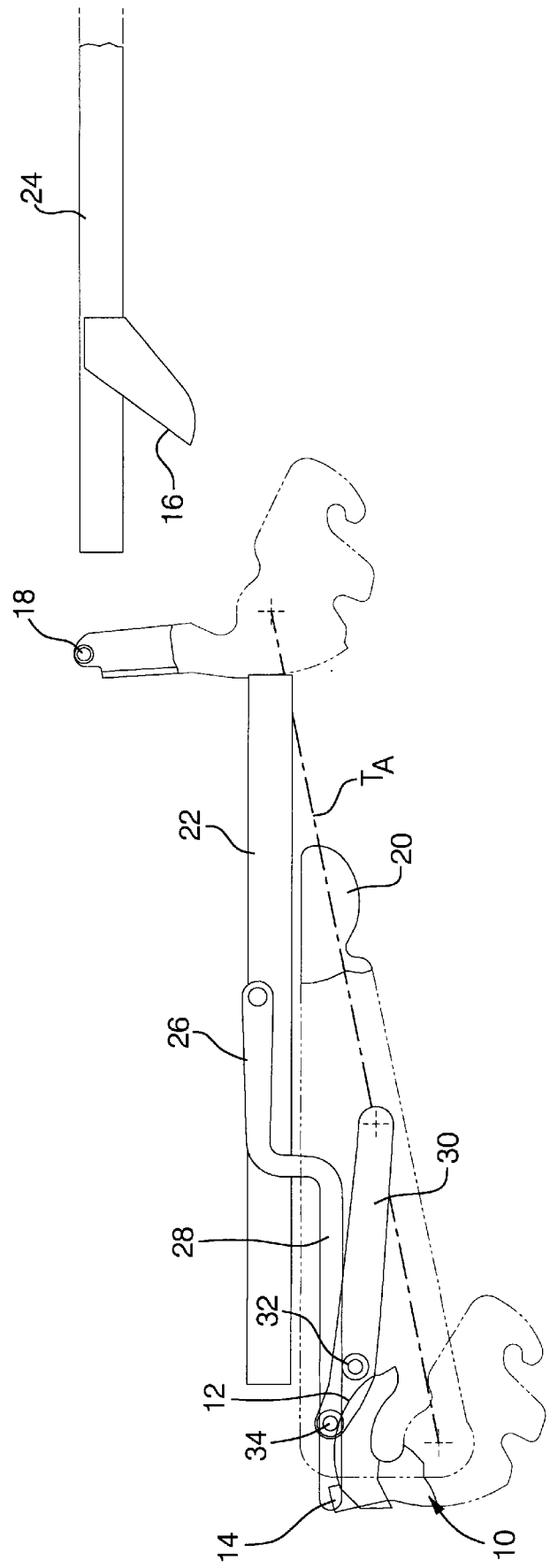
FIG. 14 shows the seat rotated back down to the normal seating position, but with the seat cushion frame shifted back.

Referring next to FIGS. 7 and 14, the structure that provides the correct degree of lift to open the adjuster latch, and keep it open, as the seat is tumbled forward is a cam, indicated generally at 10. Cam 10 is a solid, robust steel piece that is hooked rigidly to the vehicle floor below the front of the seat base, on one side of the seat base. The tumble axis Ta passes through the lower part of the cam 10, as shown, perpendicular to the fore and aft adjustment direction of the seat cushion frame. As the seat base tips forward, the cam 10 remains stationary. Cam 10 has a curved cam surface 12 arrayed about the tumble axis Ta. Cam surface 12 covers a total angle α, from rear edge to front edge, substantially equal to the tumble angle, but the curvature is not a semi circle relative to Ta. Instead, the surface 12 can be conceptualized as having a semi circular basic radius Ro (as defined above), shown by the dotted line, and rising continually from the basic radius. Over a relatively small initial angle β, moving from the rear edge forward, the cam surface 12 rises abruptly, from Ro, by the least release distance Rl, as defined above. As disclosed, β is approximately ten degrees. From the ten degree point forward, the cam surface 12 rises continually and smoothly until, at the front edge, it exceeds the basic radius Ro by the greatest release distance Rg. At arbitrary points along the cam surface 12, shown at w, x y and z, the cam surface 12 has risen beyond RL, but less than Rg. Just beyond the front edge of cam surface 12 is a wedge 14, sloped toward the side of the cam 10, which serves a purpose described below.

Figure 8:
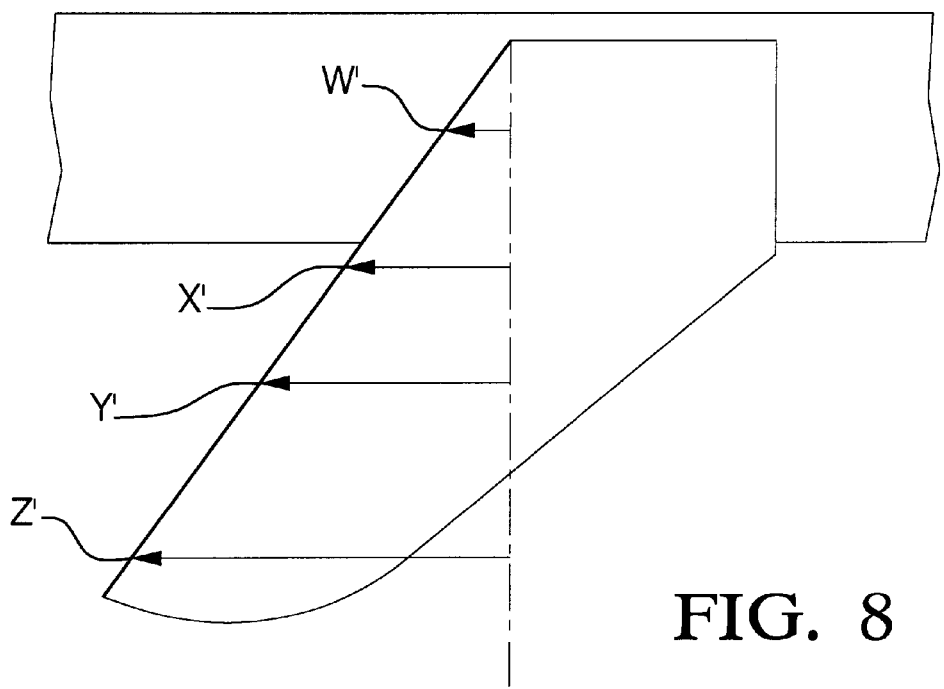
FIG. 8 is a schematic view showing the shape of the wedging surface.

Referring next to FIG. 8, working in conjunction with the cam 10 is a means for translating the rotary motion of the seat base as it is tumbled forward into a linear force that provides the necessary degree of rearward shifting of the seat cushion frame relative to the seat base. One of the structures that makes up this force translation means is a movable contact member in the form of a wedging surface 16 fixed to one of the side rails of the seat cushion frame, on the side opposite the cam 10. Wedging surface 16 is also a robust, solid steel piece, welded to the seat cushion rail and slidable back and forth with it. Wedging surface 16 contacts another, stationary member, described below, and reacts off of it to push the seat cushion frame back as the seat base rotates. The wedging surface 16 is a sharply forwardly sloped straight line. As measured forward from a dotted vertical line, wedging surface 16 slopes forward, moving from the top to bottom edge, by a total distance sufficient to shift the seat cushion frame all the way back from its forward most position to its rearward most adjusted position. As with the cam surface, at arbitrary points w', x', y' and z', wedging surface 16 will have shifted forward progressively and linearly more. Obviously, the four points on the cam surface 12 and wedging surface 16 are intended to correspond, and they cooperate to simultaneously provide both the correct degree of adjuster release handle lift and seat cushion backward shifting, as is described below.

Figure 1:
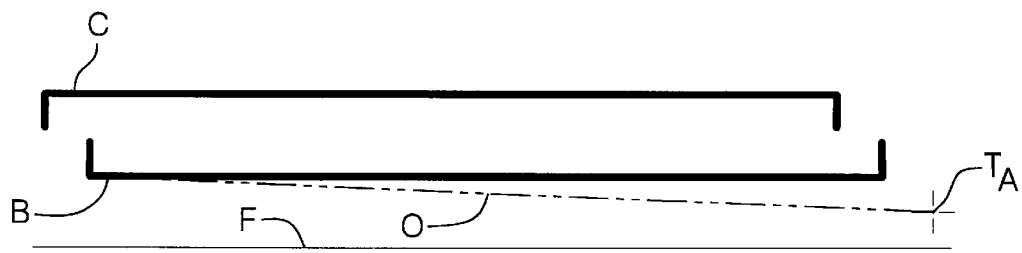
FIG. 1 is a schematic view of a seat with the seat cushion frame pushed fully back on the seat base, in the normal, seating position.
Figure 2:
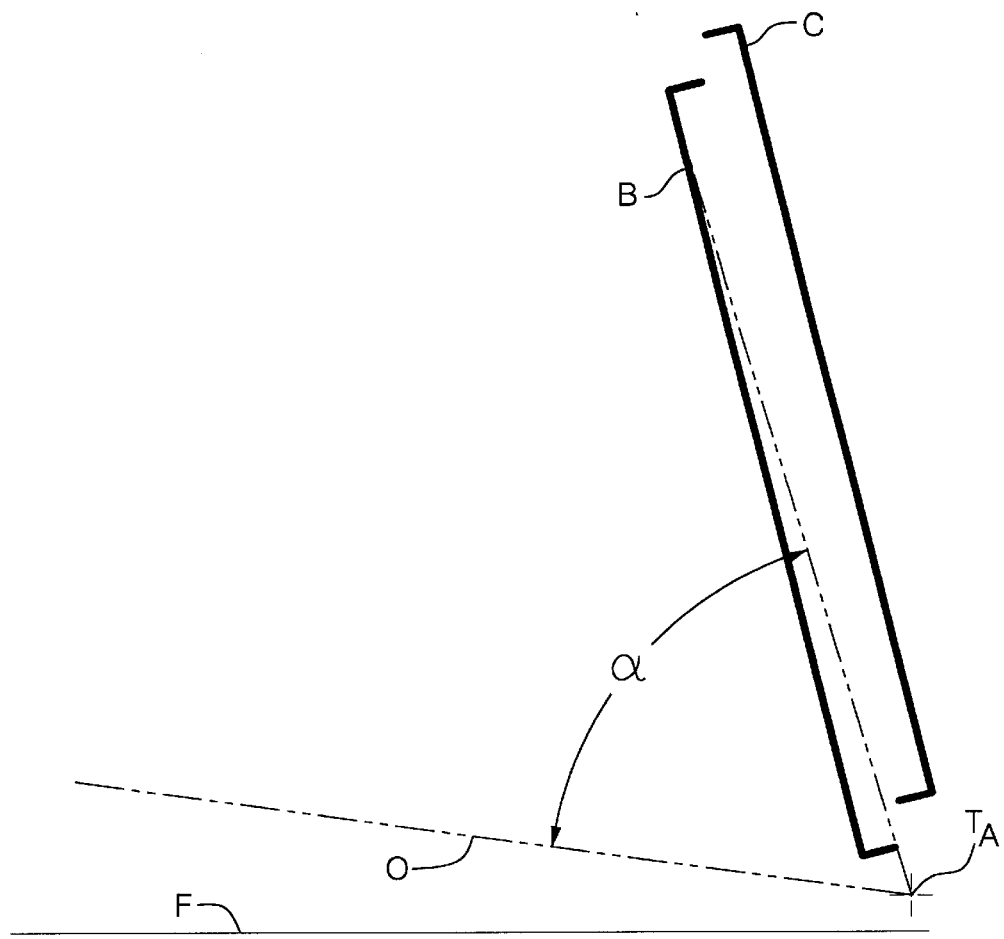
FIG. 2 is a schematic view of the seat in the fully back position after being tumbled forward.
Figure 3:
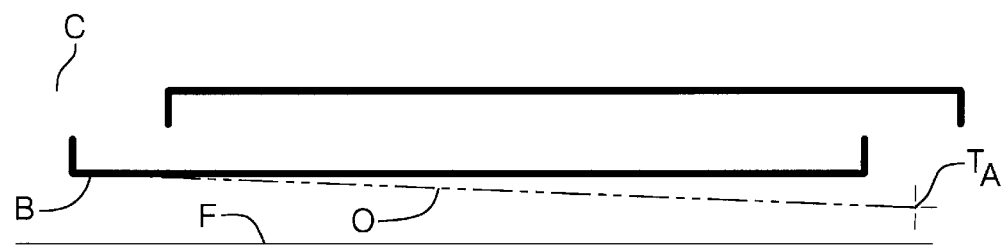
FIG. 3 is a view similar to FIG. 1, but showing the seat cushion frame pushed fully forward on the seat base.
Figure 4:
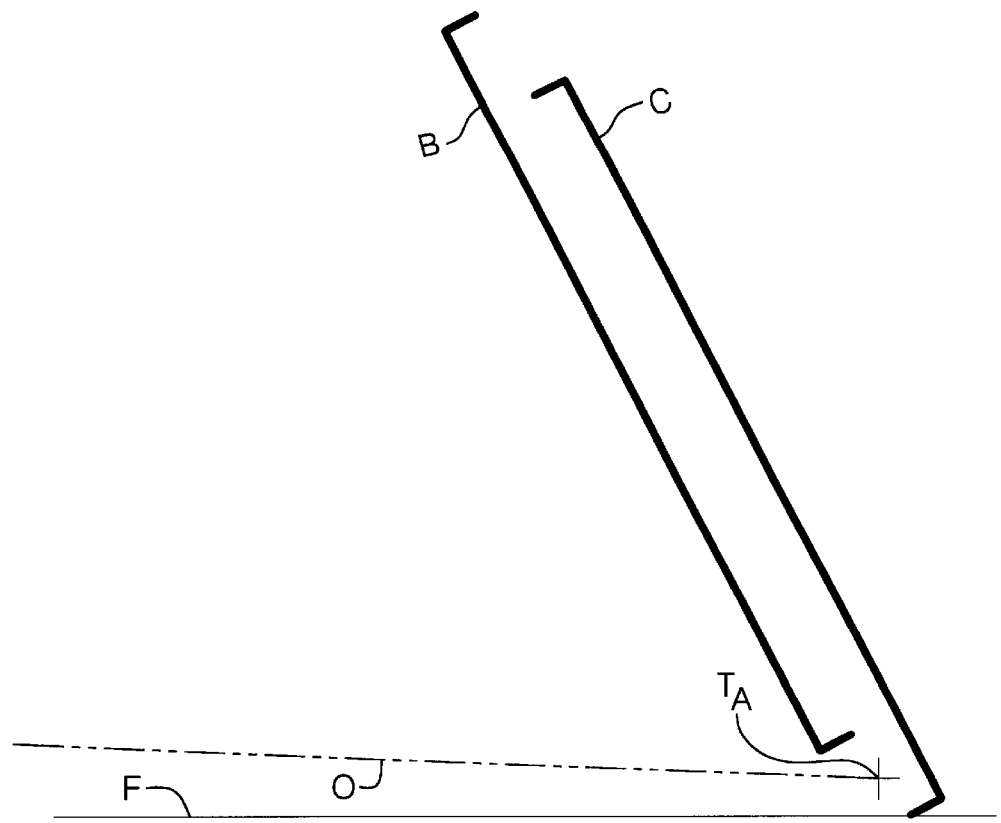
FIG. 4 is a view of the seat as shown in FIG. 3 after being tumbled forward, showing the potential interference.
Figure 9:
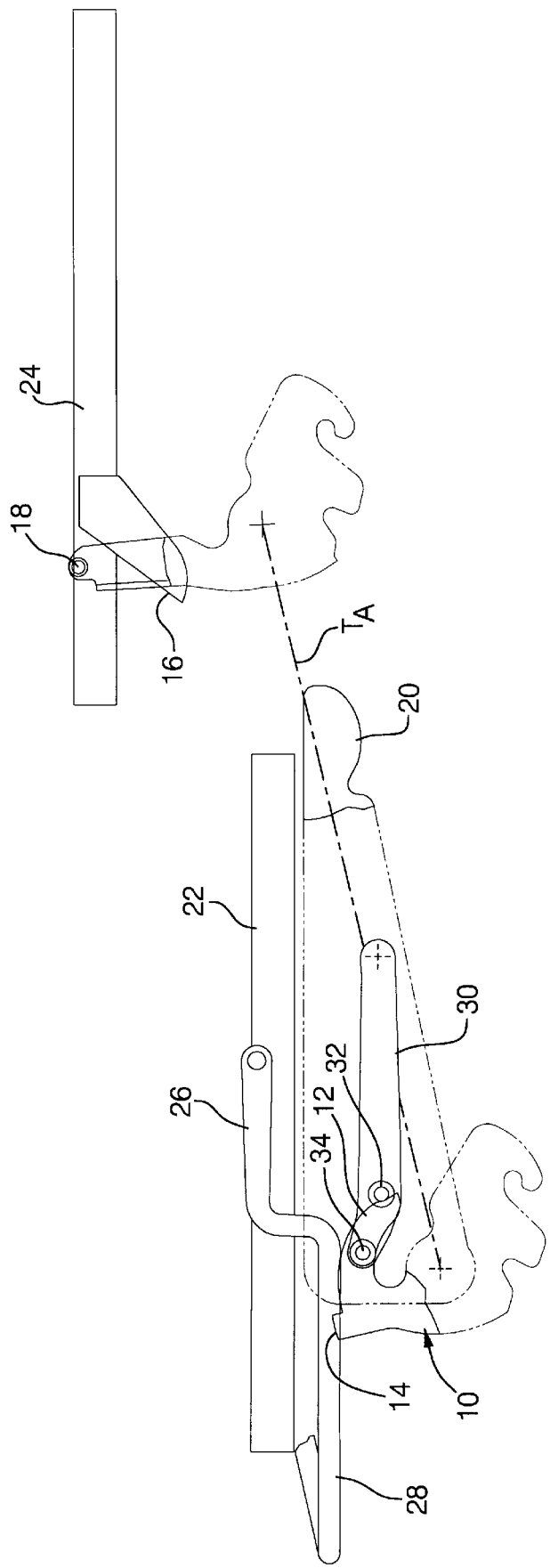
FIG. 9 is a simplified representation of the seat cushion frame, represented by two parallel side rails, and the seat base, shown in the normal seating position, locked to the vehicle floor, with the seat cushion frame rails adjusted all the way forward.

Referring next to FIG. 9, a simplified representation of a vehicle seat is shown in the non rotated, normal seating position, locked down to the vehicle floor. The vehicle seat is shown adjusted fully forward, and so is the equivalent of the situation shown in FIG. 3 above and would, without the automatic means of the invention, be subject to interference that would prevent it from being tumbled forward without interference. Cam 10 is locked to the floor on one side of and beneath the seat and, on the other side is a non movable contact member that comprises the rest of the rotary to linear transition means referred to above. A solid, steel wedging block 18 is directly opposed to cam 10, also locked rigidly to the floor, and the tumble axis Ta passes through each. The seat is represented only by the outline of the seat base 20, which pivots directly about Ta, and by a pair of side rails 22 and 24, which slide back and forth on seat base 20, when the adjuster latch is released. The side rails 22 and 24 are the foundation of the seat cushion frame, but also support other structure more important to the invention. An adjuster latch release handle 26 is generally U shaped, with one leg pivoted to side rail 22 as shown, and another leg, not illustrated, pivoted to the other side rail 24. Handle 26 is spring biased to rotate down, and when lifted up against that spring force over a relatively small angle (as discussed above), it releases the conventional adjuster latch that normally holds the side rails 22 and 24 immobile on seat base 20. Once released, the rails 22 and 24 slide back and forth in unison to the desired fore/aft position, as determined by the seat occupant, who then releases handle 26 to spring back down and relock the rails 22 and 24 to the base 20. The handle 26, of course, slides back and forth as well. What is most significant to the invention is a specially provided straight section 28 of handle 26, which lies over the cam surface 12, and which extends over and past the tumble axis Ta for all adjusted positions of the seat. Freely pivoted at its back end to the seat base 20 is a lift lever 30, which has two rollers at the front. A cam follower roller 32 rests at the rear edge of the cam surface 20, while a lift roller 34 rests just below and in line with the handle straight section 28. In the position shown, the lift roller 34 rests below the back end of the handle straight section 28. If the side rails 22 and 24 were already moved back, then the handle straight section 28 would rest beneath the front edge of the handle straight section 28. And, if the side rails 22 and 24 were to be shifted back and forth, as they would during normal adjustment, then the handle straight section 28 would simply roll freely back and forth on the lift roller 34, with no significant drag. The lift roller 34 would always stay in line with and just below the handle straight section 28, which is important to the operation of the invention. Concurrently, the wedging surface 16 would move back and away from the wedging block 18, and, if the side rails 22 and 24 were shifted fully back, the wedging surface 16 would be in the dotted line position shown, and relatively far away from the wedging block 18. But, the wedging surface 16 would always be aligned with and directly behind the wedging block 18. Likewise, at any adjusted position, the cam follower roller 32 would remain in its ready position at the rear edge of the cam surface 12. In the most forwardly adjusted position shown the seat side rails 22 and 24 require the most rearward shifting as the seat base 20 is tumbled forward about Ta.

Figure 10:
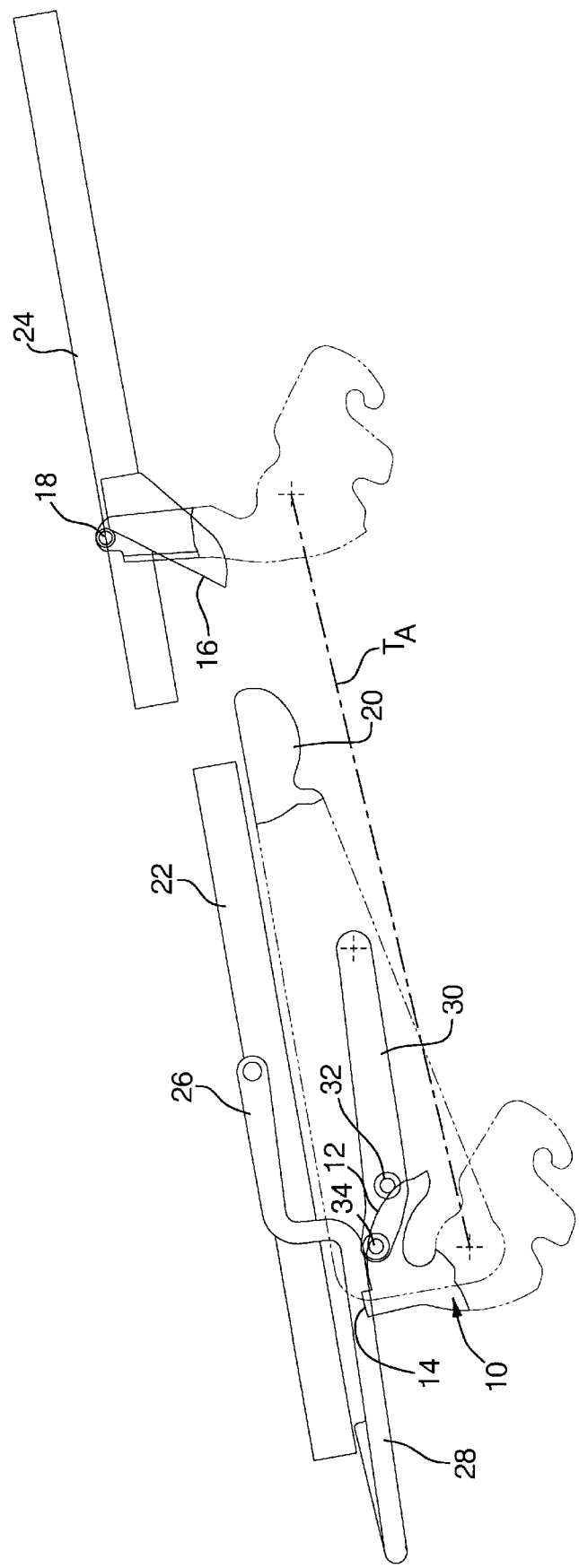
FIG. 10 shows the seat base and seat cushion frame after release and after having been rotated forward about ten degrees.

Referring next to FIG. 10, the seat base 20 has been released from the vehicle floor, while still in the farthest forward adjusted position, and rotated forward about Ta by the small angle β referred to above, or about ten degrees. The cam follower roller 32 has rolled up the initial step on the cam surface 12, while the lift lever 30 has pivoted up slightly. The lift roller 34 has moved up sufficiently to engage the latch handle straight section 28, acting to push the handle straight section radially away from the axis Ta and lift the release handle 26 by the least release distance Rl described above. Moving handle 26 up and against its own biasing spring by Rl is sufficient to unlatch the adjuster and free the side rails 22 and 24 from the seat base 20. It will be noted that the latch handle 26 has also moved from a substantially parallel orientation relative to the side rail 22 to a small angle. If that small angle is maintained, it will be sufficient to maintain the handle 26 up and open, and this condition is maintained over the whole rotation forward of seat base 20, as is described in detail below. Concurrently, over the first ten degrees of rotation, the wedging surface 16 has rotated forward and into contact with the wedging block 18. The seat rails 22 and 24 have not yet shifted back relative to the seat base 20, but are now poised to do so, simply upon additional forward rotation of the seat base 20.

Figure 11:
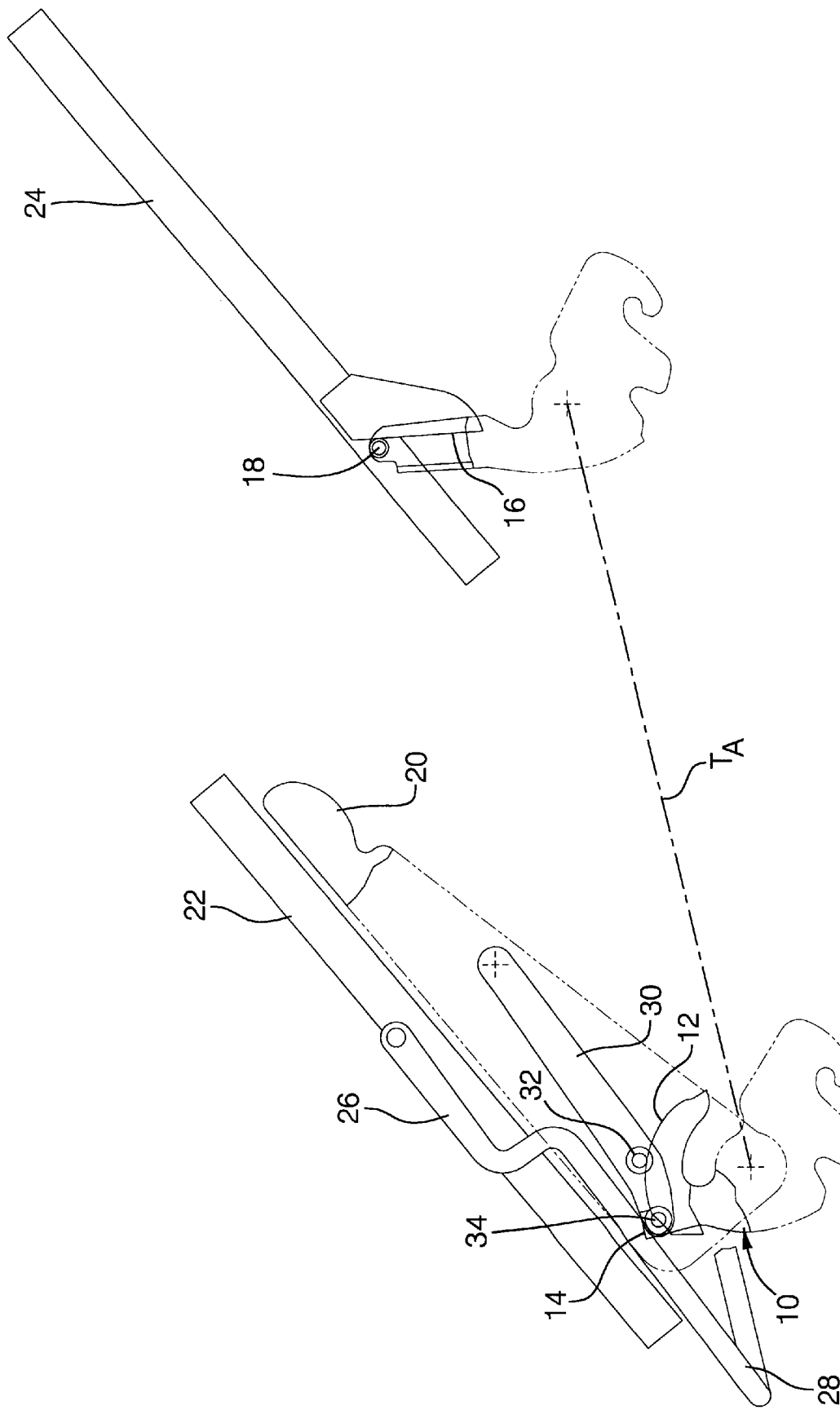
FIG. 11 shows the seat rotated forward approximately 35 to 40 degrees.

Referring next to FIG. 11, the seat base 20 has been rotated farther about Ta, to approximately thirty five to forty degrees. The cam follower roller 32 has moved farther along the cam surface 12, pivoting the lift lever 30 up farther, and pushing the latch handle straight section 28 sufficiently farther up, with the lift roller 34, to keep the adjuster latch open. The lift roller 34 rolls relatively forward and freely along and under the handle straight section 28 as it pushes it farther out and away from Ta. Concurrently, the wedging surface 16 has rotated and slid around and along the rigid wedging block 18 and shifted the side rails 22 and 24 (and the handle 26 with them) back relative to the seat base 20. While the FIG. 11 position has been described as a position reached after starting from the FIG. 9 position, the seat could also have been initially adjusted less far forward, starting out with the seat side rails 22 and 24 already in the mid position shown. In that case, at the FIG. 11 rotated position shown, all structural elements would be in the same position as depicted. However, the handle 26 would not have reached its unlatch point until then. Likewise, the wedging surface 16 would have started out farther away from the wedging block 18, and therefore would not have started to engage the wedging block 18 until the point shown. Therefore, the unlatch point of the cam follower roller 32 along the cam surface 12 is always reached at the correct point in the forward rotation of seat base 20, that is, just before the wedging surface 16 starts to engage and react off of the wedging block 18 to push the side rails 22 and 24 back.

Figure 12:
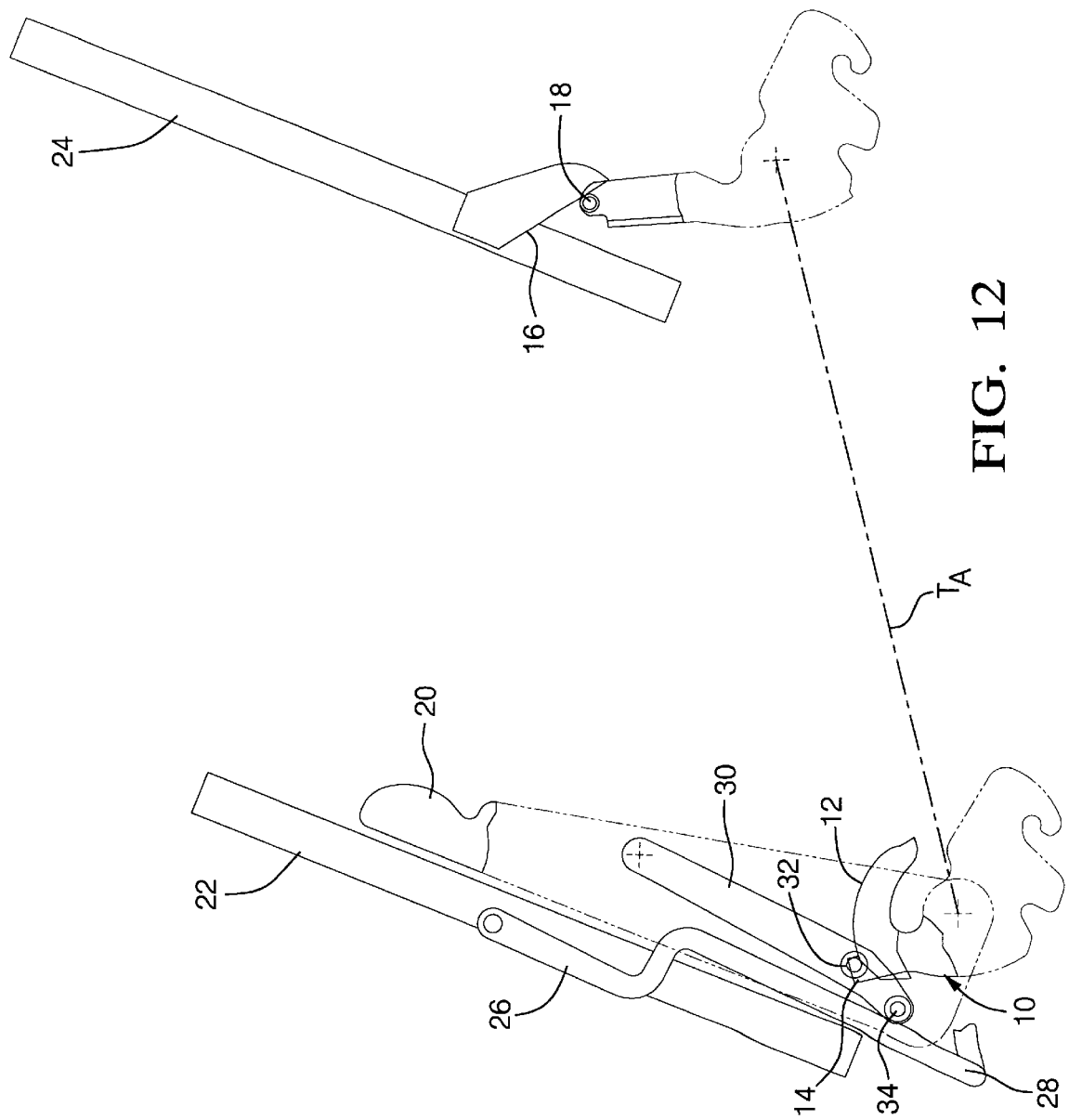
FIG. 12 shows the seat rotated forward approximately 68 degrees, just before the end of the tumble forward rotation.

Referring next to FIG. 12, the seat base 20 is shown rotated about the tumble axis Ta almost all the way, through approximately sixty eight degrees of a possible seventy two degree total. The motion of all parts from the FIG. 11 to the FIG. 12 position is a continuation of the same basic pattern, with the cam roller 32 moving farther along the cam surface 12 to keep the latch handle pivoted up to its open position. Concurrently, the wedging surface 16 has moved farther along and around the wedging block 18 to shift the side rails 22 and 24 even farther back. At the FIG. 12 position, the end of the cam surface 12 has almost been reached, the wedging block 18 has moved along almost the entire length of the wedging surface 16, and the side rails 22 and 24 have been pushed almost all the way back. Had the side rails 22 and 24 been only slightly forward of the most rearward adjusted position as the seat base 20 began to rotate forward, then the handle 26 would not have reached its open position until just before the FIG. 12 position, and the amount of rearward shifting would have been very slight.

Figure 13:
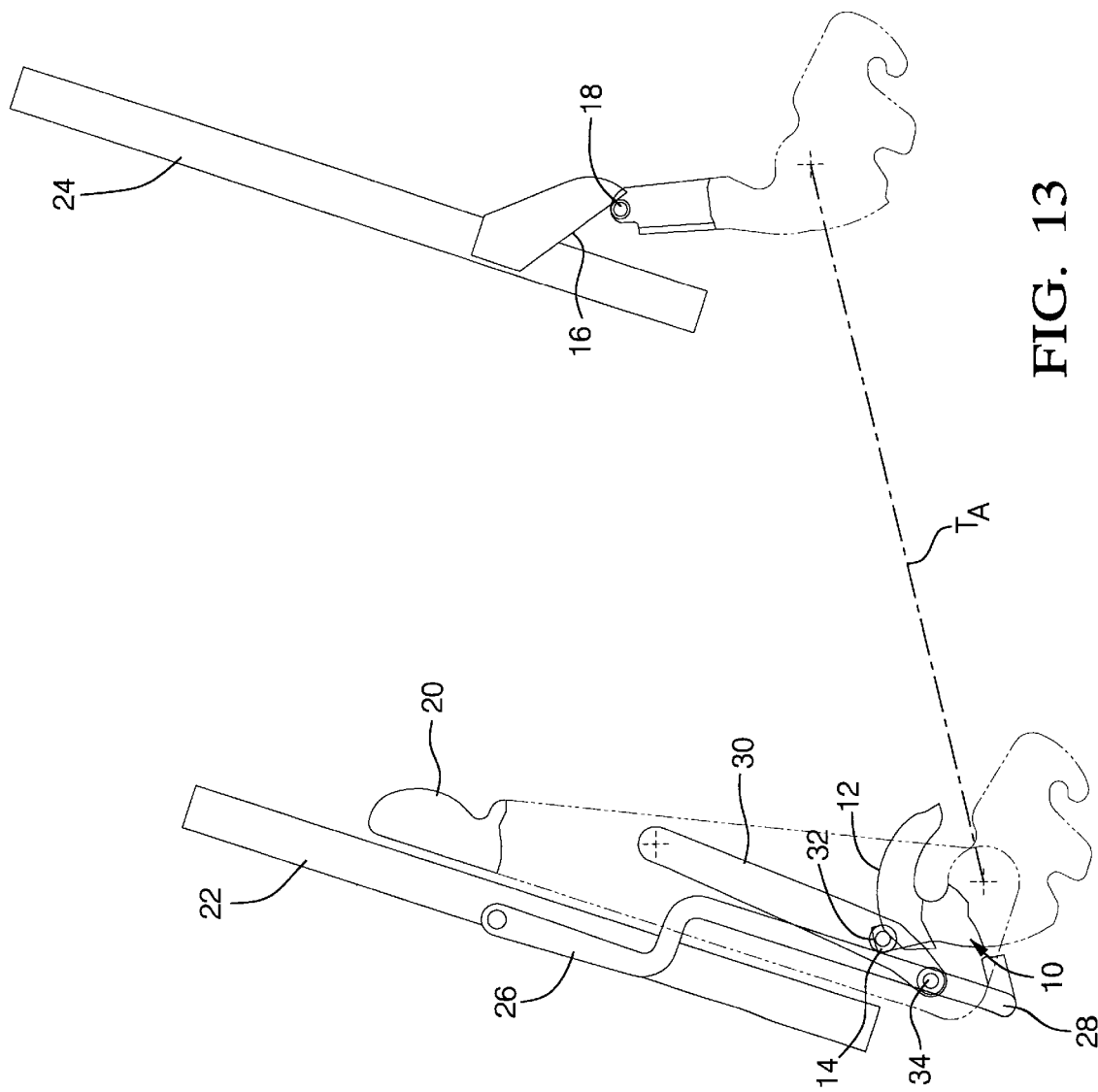
FIG. 13 shows the seat rotated forward approximately 72 degrees, at the very end of the tumble forward rotation.

Referring next to FIG. 13, the last few degrees of forward rotation result not in greater rearward shifting of the side rails 22 and 24, which is not needed, but rather in a partial resetting of the system. As the seat base 20 rotates slightly farther of the FIG. 12 position and all the way to the end of its forward rotation, the cam follower roller 32 moves off of the cam surface 12 and against the wedge 14. The cam follower roller 32, which is on a spring loaded plunger, is allowed to shift radially inwardly and off of the cam surface 12 that was holding it up. Roller 32 slides along the wedge 14 as its plunger compresses, down along the side of the cam 10 and radially inwardly of the cam surface 12. The force moving cam follower roller 32 inwardly and pivoting lift lever 30 back down is the constant downward bias of the latch handle 26, acting on lift roller 34 and lift lever 30 through the handle straight section 28. As the handle 26 pivots back down, the side rails 22 and 24 relatch to the seat base 20. Concurrently, the wedging block 18 moves along the last of the length of wedging surface 16 to shift the side rails 22 and 24 slightly farther back, just before they relatch to the seat base 20. In conclusion, the side rails 22 and 24, along with the seat cushion and frame that they carry, shift back automatically and before there can be any interference with the vehicle floor or another seat.

Referring finally to FIGS. 13 and 14, as the seat base 20 is pivoted from the stored or stowed position back the normal seating position, and relocked to the vehicle floor, the compressed cam follower roller 32 slides along the side of the cam 10, off of and radially inboard of the cam surface 12, until it reaches the rear edge of cam surface 12. At that point, the cam follower roller 32 can pop back out and over the rear edge of the cam surface 12, back to its ready position. The ready position of the cam roller 32 is the same as it was in the FIG. 9 position shown, and that is true regardless of where the side rails 22 and 24 are relative to the seat base 20. As the seat base 20 is rotated back from the FIG. 13 to the FIG. 14 position, however, the side rails 22 and 24 will stay in the most rearward adjusted position, so the wedging surface 16 will be at its farthest point back from the wedging block 18. If the seat base 20 were to be rotated forwardly again, with the seat side rails 22 and 24 already shifted back, the cam follower roller 32 would simply roll along and off of the cam surface 12 in the same path described above. The latch handle 26 would open and then reclose essentially all at once, as the cam follower roller 32 fell off the end of the cam surface 12, and the wedging surface 16 would not contact the wedging block 18 until the very end, with no effect. The operator would likely hear an audible click at the end of the rotation of the seat base 20, but there would be no visible effect of the side rails 22 and 24.

Variations in the disclosed embodiment could be made. The more difficult aspect of the total system is likely the mechanism to actuate the manual adjuster release member, which is the handle 26, as disclosed. The pivoting handle 26 is by far the most common release member for releasing the seat cushion frame from the seat base, but others could be used. The common problem faced by any release member will be the fact that while its release distance relative to the seat cushion frame, with which it moves, will be a constant, the release distance measured relative to any structure fixed to the vehicle floor, will change as the seat cushion frame moves relative to the floor from one limit position to the other. The basic concept of the invention is that a rigid cam can be fixed to the vehicle floor with a cam surface arrayed around the fixed tumble axis which rises, over a corresponding arc, to match the change in release distance that the latch release member experiences. Then, when a suitable release member actuator interposed between that rising cam surface and a suitable contact section of the adjuster release member, the rise in the cam surface is transferred through the actuator to the release member to release the adjuster and keep it released. The actuator disclosed is a freely pivoted lift lever 30, but other actuators, joined to the seat base so as to be able to move and transfer the cam surface rise from the cam surface to the release member, would work. Likewise, other mechanisms could translate the rotary motion of the seat base into the required backward shifting of the seat cushion frame, so long as it was coordinated with the action of the cam surface and actuator so as not to begin to push back on the seat cushion frame until the seat cushion frame was released from the seat base. Therefore, it will be understood that it is not intended to limit the invention to just the preferred embodiment disclosed.

We claim:

1. In a vehicle seat having a seat base that has a seating position in which it is fixed solidly to a vehicle floor, but which is releasable therefrom to be forwardly rotated over a predetermined angle to a stowed position about a fixed tumble axis located near the front of said seat base, said seat base carrying a seat cushion frame with a sliding adjuster that allows said seat cushion frame to slide fore and aft relative to said seat base, perpendicularly to said tumble axis, from a rearmost to a forwardmost position, said seat cushion frame adjuster also having a release member which must be moved relatively radially away from said tumble axis by, and held at, a predetermined varying release distance in order to allow said seat to slide fore and aft, said adjuster release member's release distance varying continuously from a least release distance when said seat cushion frame is in its forwardmost adjusted position to a greatest release distance when said seat cushion frame is in its rearwardmost position, the improvement comprising a means to automatically move said adjuster release member to, and maintain it in, its release position and concurrently move said seat cushion frame to its rearwardmost position, whenever said seat base is rotated over said predetermined angle with said seat cushion frame in an adjusted position other than its rearwardmost adjusted position, comprising;

a contact section on said adjuster release member extending over and past said tumble axis at all possible seat cushion frame adjusted positions, so as to swing around said tumble axis as said seat base rotates over said predetermined angle, a cam fixed relative to said tumble axis and having a curved cam surface defined about said tumble axis extending from a rear to a front edge corresponding to said predetermined angle of seat base rotation, said cam surface having a radial distance measured from said tumble axis that increases by said least release distance, moving from its rear edge to a defined release point located between said cam surface rear and front edge, said cam surface rising continuously farther, moving from said defined release point to said front edge, by said greatest release distance, an adjuster release member actuator movably joined to said seat base and movable radially away from said tumble axis as said seat base rotates over said predetermined angle, said actuator having a cam follower which, when said seat base is in its seating position, is located in a starting position on the rear edge of said cam surface and which is moved continuously along said cam surface from said rear to front edge, and thereby continuously radially farther away from said tumble axis, as said seat base rotates over said predetermined angle, said actuator also having a pusher located just below a straight contact member at all possible adjusted positions of said seat cushion frame, said pusher moving with said cam follower, thereby pushing said straight contact member radially away from said tumble axis sufficiently to move said adjuster release member to its release position when said cam follower has reached a point on said cam surface located between said defined release point and said front edge, said cam follower continuing to move along said cam surface as said seat base rotates over the remainder of said predetermined angle so as to maintain said adjuster release member in its release position, and, a rotary to linear transition means including a movable contact member fixed to said seat cushion frame and a stationary contact member fixed relative to said seat base and located so as to engage one another as said cam follower reaches said point on said cam surface located between said defined release point and said front edge, and thereby translate the remainder of said seat base rotation into a force pushing said seat cushion frame to its most rearward position on said seat base.

2. In a vehicle seat having a seat base that has a seating position in which it is fixed solidly to a vehicle floor, but which is releasable therefrom to be forwardly rotated over a predetermined angle to a stowed position about a fixed tumble axis located near the front of said seat base, said seat base carrying a seat cushion frame with a sliding adjuster that allows said seat cushion frame to slide fore and aft relative to said seat base, perpendicularly to said tumble axis, from a rearmost to a forwardmost position, said seat cushion frame adjuster also having a pivoting release handle which must be pulled up and away from said tumble axis by, and held at, a predetermined varying release distance in order to allow said seat to slide fore and aft, said release handle's release distance varying continuously from a least release distance when said seat cushion frame is in its forwardmost adjusted position to a greatest release distance when said seat cushion frame is in its rearwardmost position, the improvement comprising a means to automatically move said release handle to, and maintain it in, its release position and concurrently move said seat cushion frame to its rearwardmost position, whenever said seat base is rotated over said predetermined angle with said seat cushion frame in an adjusted position other than its rearwardmost adjusted position, comprising;

a substantially straight contact section on said release handle extending parallel to said fore/aft direction of seat cushion frame adjustment and long enough to extend over and past said tumble axis at all possible seat cushion frame adjusted positions, so as to swing around said tumble axis as said seat base rotates over said predetermined angle, a cam fixed relative to said tumble axis and having a curved cam surface defined about said tumble axis extending from a rear to a front edge corresponding to said predetermined angle of seat base rotation, said cam surface having a radial distance measured from said tumble axis that increases by said least release distance, moving from its rear edge to a defined release point located between said cam surface rear and front edge, said cam surface rising further continuously, from said defined release point to said front edge, by said greatest release distance, a lift lever pivoted to the seat base and having a cam follower which, when said seat base is in its seating position, is located in a starting position on the rear edge of said cam surface and which is moved continuously along said cam surface from said rear to front edge, and thereby continuously radially farther away from said tumble axis, as said seat base rotates over said predetermined angle, and a lift roller located just below said adjuster release handle straight section at all possible adjusted positions of said seat cushion frame, said lift roller moving with said cam follower roller, thereby pushing said release handle straight section up and radially away from said tumble axis sufficiently to pivot said adjuster release handle to its release position when said cam follower roller has reached a point on said cam surface located between said defined release point and said front edge, said cam follower roller continuing to move along said cam surface as said seat base rotates over the remainder of said predetermined angle so as to maintain said adjuster release handle in its release position, and, a rotary to linear transition means including a movable contact member fixed to said seat cushion frame and a stationary contact member fixed relative to said seat base and located so as to engage one another as said cam follower roller reaches said point on said cam surface located between said defined release point and said front edge, and thereby translate the remainder of said seat base rotation into a force pushing said seat cushion frame to its most rearward position on said seat base.

3. In a vehicle seat having a seat base that has a seating position in which it is fixed solidly to a vehicle floor, but which is releasable therefrom to be forwardly rotated over a predetermined angle to a stowed position about a fixed tumble axis located near the front of said seat base, said seat base carrying a seat cushion frame with a sliding adjuster that allows said seat cushion frame to slide fore and aft relative to said seat base, perpendicularly to said tumble axis, from a rearmost to a forwardmost position, said seat cushion frame adjuster also having a pivoting release handle which must be pulled up and away from said tumble axis by, and held at, a predetermined varying release distance in order to allow said seat to slide fore and aft, said release handle's release distance varying continuously from a least release distance when said seat cushion frame is in its forwardmost adjusted position to a greatest release distance when said seat cushion frame is in its rearwardmost position, the improvement comprising a means to automatically move said release handle to, and maintain it in, its release position and concurrently move said seat cushion frame to its rearwardmost position, whenever said seat base is rotated over said predetermined angle with said seat cushion frame in an adjusted position other than its rearwardmost adjusted position, comprising;

a substantially straight contact section on said release handle extending parallel to said fore/aft direction of seat cushion frame adjustment and long enough to extend over and past said tumble axis at all possible seat cushion frame adjusted positions, so as to swing around said tumble axis as said seat base rotates over said predetermined angle, a cam fixed relative to said tumble axis and having a curved cam surface defined about said tumble axis extending from a rear to a front edge corresponding to said predetermined angle of seat base rotation, said cam surface having a radial distance measured from said tumble axis that increases by said least release distance, moving from its rear edge to a defined release point located between said cam surface rear and front edge, said cam surface rising further continuously, from said defined release point to said front edge, by said greatest release distance, a lift lever pivoted to the seat base and having a cam follower which, when said seat base is in its seating position, is located in a starting position on the rear edge of said cam surface and which is moved continuously along said cam surface from said rear to front edge, and thereby continuously radially farther away from said tumble axis, as said seat base rotates over said predetermined angle, and a lift roller located just below said adjuster release handle straight section at all possible adjusted positions of said seat cushion frame, said lift roller moving with said cam follower roller, thereby pushing said release handle straight section up and radially away from said tumble axis sufficiently to pivot said adjuster release handle to its release position when said cam follower roller has reached a point on said cam surface located between said defined release point and said front edge, said cam follower roller continuing to move along said cam surface as said seat base rotates over the remainder of said predetermined angle so as to maintain said adjuster release handle in its release position, a wedging surface fixed to said seat cushion frame that is continuously forwardly sloped to a degree sufficient to shift said seat cushion frame back from its forwardmost to its rearwardmost position, and a wedging block fixed relative to said seat base and located so as to engage said wedging surface as said cam follower roller reaches said point on said cam surface located between said defined release point and said front edge, and thereby translate the remainder of said seat base rotation into a force pushing said seat cushion frame to its most rearward position on said seat base.

* * * * *